United States Patent
Prasse et al.

[11] 3,847,518
[45] Nov. 12, 1974

[54] POLYIMIDE HIGH-TEMPERATURE RESISTANT PLASTIC SEALING ELEMENT

[75] Inventors: Herbert F. Prasse, Town and Country; Harold E. McCormick, Ballwin, Mo.

[73] Assignee: Ramsey Corporation, St. Louis, Mo.

[22] Filed: Dec. 18, 1972

[21] Appl. No.: 316,226

[52] U.S. Cl. .............................. 418/122, 418/152
[51] Int. Cl. ............................................ F04c 27/00
[58] Field of Search ........................... 117/161 UN, 418/113, 122, 123, 124, 152, 178

[56] References Cited
UNITED STATES PATENTS

| | | | |
|---|---|---|---|
| 3,194,488 | 7/1965 | Fuhrmann | 418/113 |
| 3,281,064 | 10/1966 | Springer | 418/152 X |
| 3,519,371 | 7/1970 | Holland et al. | 418/152 X |
| 3,565,549 | 2/1971 | Lubowitz | 117/161 UN |
| R24,932 | 1/1961 | Davey | 418/178 X |

*Primary Examiner*—C. J. Husar
*Assistant Examiner*—Leonard Smith
*Attorney, Agent, or Firm*—Hill, Gross, Simpson, Van Santen, Steadman, Chiara & Simpson

[57] ABSTRACT

A sealing element formed of a reinforced molded and cured polyimide resin, preferably an end-capped, polyimide resin, such as disclosed in U.S. Pat. Nos. 3,528,950 and 3,565,549, which has high thermal stability, high bending strength, low modulus of elasticity, low density, high capacity for vibration damping and high degree of ductility. The polyimide resin-forming prepolymer is mixed with a filler to impart desirable characteristics thereto and the resulting prepolymer composition is then subjected to compression molding to form a sealing element and/or a bearing facing therefor for use in internal combustion engines of both the reciprocating and rotary type to effect a seal against the flow of fluids between superficially contacting, relatively slidable surfaces such as those of a piston and its housing. The filler can be so selected from fibers and powders of organic and/or inorganic material, and can be used in such proportions to the polyimide resin as to impart to the sealing element increased compatibility with less wear and scuffing and with a lessened tendency toward chattering during operation of said sealing elements in contact with the mating parts, such as the trochoid housing and also the housing side plates of a rotary piston type of engine.

6 Claims, 2 Drawing Figures

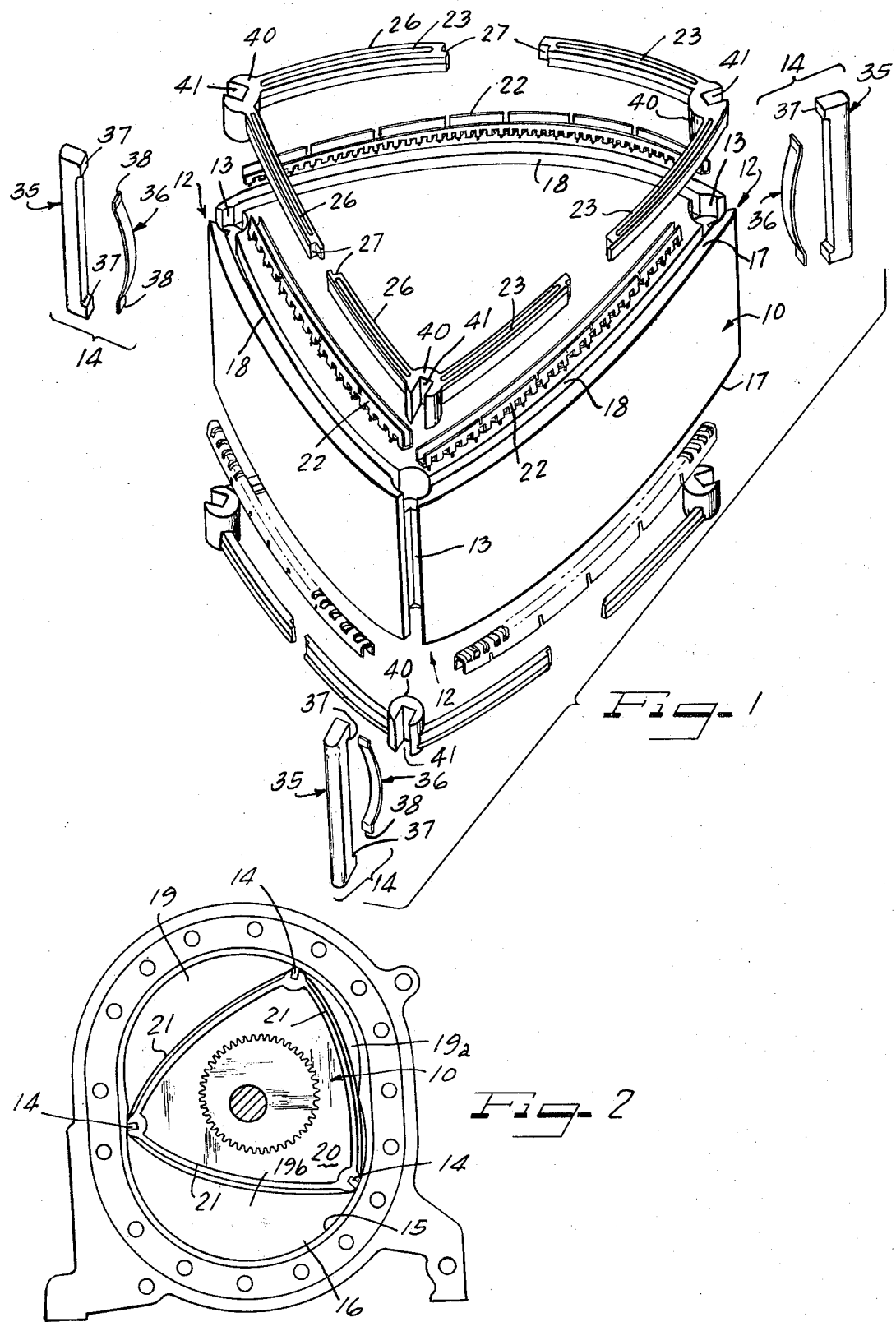

POLYIMIDE HIGH-TEMPERATURE RESISTANT PLASTIC SEALING ELEMENT

BACKGROUND OF THE INVENTION

1. Field of the Invention

The invention is concerned with a plastic sealing element that is formed of a molded and cured polyimide resin composition containing a filler that imparts improved characteristics to the sealing element made therefrom. The preferred type of polyimide prepolymer is similar to those described in U.S. Pat. Nos. 3,528,950 and 3,565,549.

Polyimide prepolymers of the general type described in those patents are particularly suited for use in the molding of high-temperature resistant, reinforced plastic sealing elements. The fillers or reinforcing materials used are preferably such as to increase the flexural and the bending strength of the sealing elements and the scuff- and wear-resistance of the bearing faces thereof. The sealing elements are particularly useful when molded to forms that are compatible with mating parts of a rotary piston and its trochoid housing, as in the Wankel type rotary engine.

2. Description of the Prior Art

Piston rings for use in the conventional reciprocating type of internal combustion engine have generally been made of a ferrous metal, with or without bearing facings of especially hard, refractory, scuff- and wear-resistant metals or alloys. The present invention departs from such prior art in providing sealing elements for pistons and the like that are made by molding or casting a polyimide resin-forming, prepolymer composition containing or mixed with a suitable filler for imparting desired physical properties to the molded sealing element, or to the bearing surface or facing thereof.

SUMMARY OF THE INVENTION

The present invention provides a sealing element for an internal combustion engine that may be molded by the use of techniques that are similar to those used in the molding of thermosetting, or thermosettable resins. In the case of the preferred end-capped polyimide prepolymers used in making the sealing elements of this invention, the ultimate resin is prepared by heating a polyimide prepolymer to temperatures of about 200° to 350°C., at which the prepolymers become active, as disclosed in U.S. Pat. No. 3,528,950. Reference is also made to U.S. Pat. No. 3,647,529 for its disclosure of a process for preparing a reinforced article by impregnating the reinforcing material with a polyimide prepolymer. This latter patent also discloses the use of a low molecular weight polyimide prepolymer as a fusible matrix for high molecular weight polyimide prepolymer powder, using elevated temperatures of around 450° to 600°F., and pressures of around 1,000 psi in the molding step.

The present invention utilizes much of the information contained in these designated patents in the preparation of reinforced polyimide resin compositions. Reinforcing material is selected in accordance with the particular properties that are desirably imparted to the finished, molded sealing element, with a view to solving problems that have been well recognized but not as yet completely solved.

Among such problems is the well-known chatter problem, which is particularly troublesome in connection with the apex seal used in rotary engines for effecting a seal between the rotary piston and the inner trochoid surfaces of the piston housing. For a relatively small rotary-type engine the seal surface speeds exceed the surface speeds for piston rings in piston-type internal combustion engines. Also, the temperature of the firing portions of such engines is too high to support a lubricant film under high load conditions of operation. Measured temperatures in aluminum trochoid chambers reach values higher than 420°F., whereas it is well known that lubricating oils break down at temperatures of about 300°F.

Depending upon the coefficient of friction between the mating surfaces, forces due to friction can increase to such an extent as to overcome the minimum load on the sealing element and cause the apex seal, for instance, to leave the trochoid surface and alternately stick and slip and thereby give rise to the chatter problem.

It is therefore an important object of this invention to provide a reinforced polyimide resin sealing element having the following properties:

1. The coefficient of friction between the seal and the mating surface must be 0.2 or less at bulk temperatures of 600°F.;
2. The sealing element must have a low modulus of elasticity;
3. The sealing element should have dry-running capability to provide a low coefficient of friction when the oil film breaks down at high-operating temperatures;
4. The sealing element must have a low mass of less than 0.1 lb./in.$^3$;
5. The sealing element must be capable of withstanding bulk temperatures of 600°F. and surface temperatures up to 1,000°F.;
6. The seal must have a wear- and scuff-resistant bearing facing, or surface;
7. The sealing element should have a high capacity for vibration damping;
8. The sealing element must have a minimum bending strength of 75,000 psi to withstand conditions of abnormal combustion; and
9. The sealing element must have sufficient ductility to withstand shock loads of 280 lbs., instantaneously applied over 2-¾ inches in-line contact with the face of the seal without chipping.

The apex seals of the present invention solve problems that have been associated with the chatter and other problems attendant upon the use of the prior art very hard seal materials operating against very hard trochoid surfaces. Examples of such prior art are the uses of "ferrotic" (titanium carbide in a steel matrix), operating against silicon carbide-nickel-plated trochoid surfaces. Silicon nitride seals have also been used against very hard trochoid surfaces. These materials tend to reduce the effect of the chatter problem but do not stop it, and, furthermore, are relatively expensive.

Instead of using very hard seal materials, the prior art has suggested the use of composite materials, such as graphite impregnated with aluminum, but while such material has relatively low mass, it does not have good abrasive wear resistance nor does it have sufficient strength to withstand abnormal combustion and breaks in service when this phenomenon is encountered.

With respect to side compression seals used in the rotary type of internal combustion engines, the seals are arcuate in shape and are made from relatively high modulus material such as cast iron or steel. Because the materials used are high modulus materials and because the seals are arcuate in form, the cross-section area of the seals must be very small so that the seals can twist in operation and conform to the side housing surfaces to effect a seal. The small sections of the seal required for flexibility make it necessary that they be fitted in very narrow grooves in the rotor side faces. These grooves are extremely difficult and expensive to machine to the required accuracy for adequate sealing because the tools used must be of very small sectional area. Consequently, the tools yield under the machining loads and provide less than the desired accuracy. The narrowness of the grooves makes forging or powder metal processes impractical for pre-forming the grooves.

However, in spite of the very narrow sections required in the side compression seals, the seals are not flexible enough to follow the side housings under all conditions of operation. Consequently, it is necessary to apply expensive hard face coatings to the side housing surfaces in order to minimize scarring and marking housings due to failure of the seals to follow without digging in under certain conditions of operation.

According to the prior art, oil seal bearing surfaces also have had hard facings applied both to the seals and to the mating side housing running surfaces.

It is therefore an object of the present invention to provide a reinforced plastic material for rotary engine seals which meet the requirements of low modulus, dry-running capability, low coefficient of friction, good abrasive wear resistance, low mass, high strength and compatibility with various mating surfaces as required, such as cast iron, chromium plate, high silicon-aluminum, silicon carbide-nickel, and tungsten carbide-nickel-chrome-boron-silicon plasma-flame applied coatings.

It is a further object of this invention to provide rotary engine seals that can be compression-molded from low modulus plastic materials, thereby lowering or even eliminating machining costs.

A further object of this invention is the provision of low modulus plastic material that allows better conformability with the mating sealing surfaces of the rotary engine components.

A further object of this invention is the provision of conformable side seals without the necessity of making the seal sections so small as to make machining of the grooves difficult and costly when manufacturing to the required accuracy for efficient sealing.

It is a further object of this invention to provide a light-weight, reinforced plastic seal having a hard, abrasive- and wear-resistant, running surface.

The properties of the polyimide material most suitable for making the plastic seals of our invention are as follows:

| | |
|---|---|
| Density is low | 1.33 gm/cc |
| Hardness shore | 91.0 ± .5 |
| Flexural strength at 77°F | = 10,000 – 12,000 p.s.i. |
| Flexural strength at 550°F | = 5,000 – 6,000 p.s.i. |
| Flexural modulus at 77°F | =460,000 – 490,000 p.s.i. |
| Flexural modulus at 550°F | =280,000 – 300,000 p.s.i. |
| Tensile strength at 77°F | = 7,200 p.s.i. |
| at 550°F | = 5,700 p.s.i. |
| Tensile modulus at 77°F | =556,000 p.s.i. |
| at 550°F | =346,000 p.s.i. |
| Elongation at failure % 77°F | =1.37 |
| Elongation at failure % 550°F | =1.82 |
| Compressive strength at 77°F | = 37,400 p.s.i. |
| Compressive modulus at 77°F | =419,000 p.s.i. |

DETAILED DESCRIPTION

While various types of high-temperature resistant, oxidative-stable polyimides can be used in the practice of my invention, it is preferred to employ a thermosetting or thermoset polyimide resin made in accordance with the following equation:

A POLYIMIDE PREPOLYMER

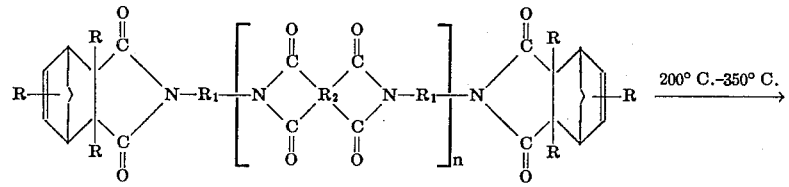

POLYIMIDE RESINS in which R is selected from the group consisting of a hydrogen atom and a C-1 to C-5 alkyl group, and $R_1$ and $R_2$ represent an aliphatic or aromatic hydrocarbon group, and the value of $n$ ranges from 0 to 8.

Polyimide resins made in accordance with the above equation are described in the aforesaid U.S. Pat. No. 3,528,950. As stated in the abstract of that patent:

"The polyimides are prepared by heating polyimide prepolymers having specific terminal or end-capping chemical groups which result from co-reacting specific monoanhydrides with mixtures of dianhydrides and diamines. These chemical groups are stable at room and moderately elevated temperatures but become reactive at temperatures of about 200° to 350° C. thereby forming macromolecules. The specific end-capping anhydrides are compounds having the structural formula

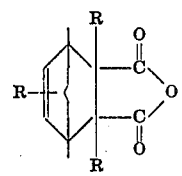

where R represents hydrogen or a lower alkyl."

When heated to temperatures ranging from about 200°C. to about 350°C., the end groups, referred to as end-capping anhydrides, become reactive with each other and polymerize to provide an end-to-end molecular linkage producing a macromolecule.

BRIEF DESCRIPTION OF DRAWINGS

The polyimide resins are of particular application in the making of seals, including apex seals, for use in the rotary piston type of internal combustion engine, such as the Wankel engine. In the accompanying drawing, FIG. 1 is an exploded perspective view of a rotary-type piston equipped with the seals of this invention; and FIG. 2 is a plan view of a rotary piston type engine rotor received in a trochoid chamber of a suitable housing.

DETAILED DESCRIPTION OF A PREFERRED EMBODIMENT

FIG. 1 is a perspective view of a rotary piston internal combustion engine rotor generally indicated by the reference numeral 10. The rotor is generally triangular in shape and has three side walls 17 forming its outer periphery, each of the side walls being curved and meeting the adjacent side wall at an apex indicated generally at 12. A groove 13 is formed at each of the apexes 12 and extends the full length of the walls on either side of each apex 12.

As illustrated, a blade-type non-rotating apex seal assembly 14 is provided for each of the grooves 13. Each such seal assembly includes a blade 35 and a leaf spring 36 for positioning in back of the blade to urge the blade radially outwardly from the groove against the inner surface of a trochoid-shaped piston chamber 16. Each blade 35 has end abutments 37 for engagement by the ends 38 of the springs 36 and thus limit relative longitudinal movement between each spring and its associated blade 35. The blades 35 are preferably made of a reinforced molded or cast polyimide resin, while the springs 36 are suitably formed of high temperature resistant spring steel.

Grooves 18 are formed in the side walls 17 of the rotor to extend peripherally from the end of one apex groove 13 to the corresponding end of the next adjacent groove 13. Each of the grooves 18 receives a compression seal 21, which, together with the apex blade seal assemblies 14, seal the periphery of the housing into a number of successive volume-changing chambers 19, 19a and 19b defined between the periphery of the rotor 10 as it rotates and the inner trochoid surface of the piston housing. The compression seals are necessary to prevent leakage from the chambers 19, 19a and 19b along the side of the rotor between the side walls 17 and the end plates to the open inner space 20 of the rotor. In addition, since some areas of the rotor chamber are always under high pressures whereas other areas are always under lower pressures, the compression seals 21 which are received in the grooves 18 serve to prevent sideways leakage from the high pressure areas to the low pressure areas.

In order to reduce the cavity at the sides of the rotor outwardly from the compression seals 21, the seal-receiving grooves 18 are formed as closely as possible to the peripheral surface of the rotor, with the grooves 18 communicating with the ends of the apex grooves 13.

Expander springs 22 are received in the grooves 18 and, in turn, combination corner and compression seal members 23 are received in said expander springs 22. The combination corner and compression seal members 23, FIG. 1, resemble wishbones in shape, each having a hub 40 provided with a groove 41 and with pairs of divergent leg sections 23—23 and 26—26 formed integrally with a hub 40. Each of the compression seal sections terminates in a stepped end 27, which is matable with the stepped end 27 of an adjacent compression seal section.

Three such seal members 23 are used for each rotor side wall, each of the seal members having its hub 40 received at the longitudinal end of the apex seal groove 13 and the compression seal leg sections 26 received in the grooves 18 diverging from the apex groove 13. The legs of the compression seal leg sections 26 are so dimensioned when mated as to extend approximately one-half of the distance spanned by the grooves 18 from one apex 12 to the next.

Any of the seals, such as the apex seals 14 and the seal members 23 and leg sections 26 can be produced by molding a polyimide resinous composition such as described herein by techniques like those that are employed in the molding of thermo-settable or thermo-setting resins. A description of suitable methods for making the plastic polyimide seals and the like follows.

DESCRIPTION OF PREFERRED EMBODIMENTS

The preferred polyimide prepolymer for use in making the high temperature resistant plastic sealing element of the present invention is a polyimide prepolymer or a precursor thereof, such as described in U.S. Pat. No. 3,565,549. The precursor can suitably be a polyamide-acid, capable of being dissolved in an organic solvent, such as dimethyl formamide, in amounts of the polyamide-acid ranging from about 10 to 65 percent, and more preferably in amounts from about 25 to 50 percent by weight of the solvent. Polyamide-acids are used rather than a polymerized polyimide, which is practically infusible, since the polyamide-acids, or polyamic acids, are solvent-soluble and can be pyrolytically polymerized, in situ, to give a thermally stable polyimide resin.

Before the pyrolytic polymerization step, a solution of the polyamic acids is mixed with the selected filler or reinforcing material in any required proportions to obtain the desired properties in the final cured reinforced polyimide resin. The proportions of dry solids can be varied from 5 to 95 percent filler or reinforcing material, with the balance polyimide resin.

The pyrolytic polymerization of this polyamide-acid content of the mixture to be molded is effected just ahead of the molding step as a separate preliminary step or as a part of the molding step that is carried out in a compression mold. As explained in the U.S. Pat. No. 3,565,549, column 3, the pyrolitic polymerization can essentially be carried out without the evolution of volatile matter. Consequently, it is merely necessary to remove the solvent by a drying operation at temperatures up to 260°C. and then to continue the heating up to about 350°C. to cyclize the polyamide-acids to polyimide prepolymers and finally cause the prepolymer-impregnated reinforcing materials to form integral structures.

Pressures up to 1,000 psi or higher are used in the final molding step and temperatures ranging up to about 350°C. are maintained for a sufficient length of time until completely cured resinous structures of good thermal stability toward high temperatures, such as bulk temperatures of 350°C. and surface temperatures up to 540°C., are obtained.

By selecting molds of the proper size, shape and design, plastic sealing elements can be made of the herein described reinforced polyimide resins having the desired properties for use in a rotary type internal combustion engine, such as that illustrated in the accompanying drawings.

The reinforcing materials that have been found suitable for increasing the wear-and scuff-resistance of the sealing element include the following light-weight, hard materials: aluminum-oxide, zirconia, titaniumoxide, high silicon aluminum, aluminum carbide, titanium carbide, boron nitride, boron carbide, vanadium carbide, chromium, chromium carbide, and other refractory metals, metal oxides, metal carbides and metal nitrides.

The light-weight requirement is particularly directed toward apex seals where the requirement is that the total average composite density should not exceed 2.3 grams/cc.

Heavy density reinforced materials can be used to improve wear-and scuff-resistance in the case of side seals and oil seals where it is permissible that the average composite density exceed 2.3 grams/cc. Among such heavy reinforcing materials are included tungsten, tungsten carbide, molybdenum, tantalum, tantalum carbide and other high density, highly refractory metals and carbides thereof.

The requirement that the sealing element be of high strength and yet of light weight can be obtained by the addition of reinforcing material that is capable of increasing the strength of the final molded article, such, for instance, as boron fibers, which are capable of tensile strengths in the area of 500,000 psi; zirconia fibers, which may reach 200,000 psi and are very light in weight; magnesium whiskers, which are capable of extremely high tensile strength, approaching 3,500,000 psi. Carbon-graphite fibers, as well as certain metallic fibers, may also be used as reinforcing material to increase the strength of the molded sealing element. Other examples are: silicon carbide-tungsten, reaching a tensile strength of 200,000 psi; boron carbide-tungsten, reaching a tensile strength of 330,000 psi; and silicon carbide-graphite-boron nitride.

In order to reduce the friction between the bearing face and its contacting surface, and provide dry-running or self-lubricating qualities necessary for the apex seal application, the reinforced high temperature resistant polyimide resin type of plastic seal may include friction-reducing fillers such as graphite, particulate carbon, and molybdenum disulfide. A typical apex seal of this invention consists of a compression-molded polyimide material containing carbon-graphite fibers for increased strength, titanium carbide for abrasive wear-resistance, and particulate graphite at the wear surface, or surface of the bearing facing, for low friction characteristics and dry-running capability.

The following are examples of various compositions of molded reinforced polyimide resins containing various kinds and proportions of reinforcing materials:

EXAMPLE 1

Fifty percent by weight of polyimide resin and 50 percent by weight of an alloy matrix composition containing a hard tungsten wear-resistant phase having a hardness of about 2,800 Vickers (40) DPN, in a matrix having a hardness of the order of 1,000 Vickers (40) DPN.

EXAMPLE 2

Fifty percent by weight of polyimide resin and 50 percent by weight aluminum (powder).

EXAMPLE 3

Fifty percent by weight of polyimide resin and 50 percent by weight of a powdered coating material consisting of 12 to 15 percent titania and a minimum 78% by weight of aluminum oxide ($Al_2O_3$).

EXAMPLE 4

Fifty percent by weight of polyimide resin, 20 percent by weight of particulate graphite and 20 percent by weight of chopped fiber graphite.

Where the principal purpose of the filler is to impart greater wear- and scuff-resistance to the reinforced molded and cured polyimide resin composition it has been found eminently satisfactory to use as the filler hard particulate ceramic materials such as aluminum oxide ($Al_2O_3$), zirconia, titania, and mixtures thereof, and also mixtures of any of these ceramic materials with any of the heavy reinforcing materials and/or lightweight, hard refractory materials named above.

We claim:

1. An apex seal for a rotary type internal combustion engine in which the apex seal effects a seal between an apex of a rotor and a trochoidal inner surface of the rotor housing,
    said seal having an outer peripheral bearing face of a filler-reinforced, end-capped polyimide resin for sliding contact with said trochoidal inner surface.
2. An apex seal as defined by claim 1, wherein said filler is graphitic in character and imparts dry-running, self-lubricating properties to said bearing face.
3. An apex seal as defined by claim 2, wherein said filler is a mixture of particulate and fiber graphite.
4. An apex seal as defined by claim 1, wherein said polyimide resin is an infusible polymer resulting from heating a prepolymer of the structure shown below to a temperature of within the range of from 200°C. to 350°C. in accordance with the following equation:

A POLYIMIDE PREPOLYMER

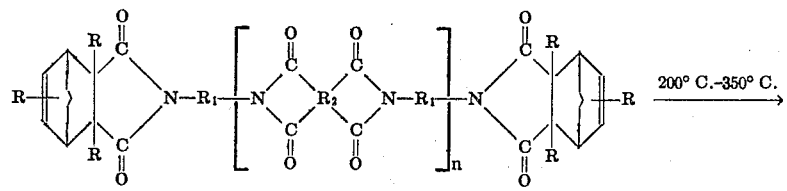

POLYIMIDE RESINS in which R is selected from the group consisting of a hydrogen atom and a lower alkyl group having 1–5 carbon atoms, $R_1$ and $R_2$ represent an aliphatic or aromatic hydrocarbon group, and the value of *n* ranges from 0 to 8.

5. An apex seal as defined by claim 4, wherein said seal has an inner bearing surface also of a filler-reinforced polyimide resin.

6. An apex seal as defined by claim 4, wherein said sealing element has a mass of less than 0.1 lb./in.$^3$.

* * * * *